United States Patent Office 3,658,849
Patented Apr. 25, 1972

3,658,849
TREATMENT OF 2-SUBSTITUTED ALDEHYDES
WITH LEAD DIOXIDE
John Charles Leffingwell, Winston-Salem, N.C., assignor to R. J. Reynolds Tobacco Company, Winston-Salem, N.C.
No Drawing. Filed Feb. 19, 1969, Ser. No. 800,727
Int. Cl. C07d 5/06
U.S. Cl. 260—343.6          2 Claims

ABSTRACT OF THE DISCLOSURE

A process for producing substituted γ-lactones and substituted alkenoxyalcohols from 2-substituted aldehydes using lead dioxide.

This invention relates to synthesis of organic compounds and more particularly to the synthesis of organic compounds from aldehydes.

In general, the present invention relates to the discovery that lead dioxide can be employed advantageously to treat aldehydes to form coupling products which can then undergo, in situ, an intramolecular reaction to produce substituted γ-lactones and substituted alkenoxyalcohols, if so desired.

The conversion of aldehydes in accordance with the present invention can be generally illustrated as follows:

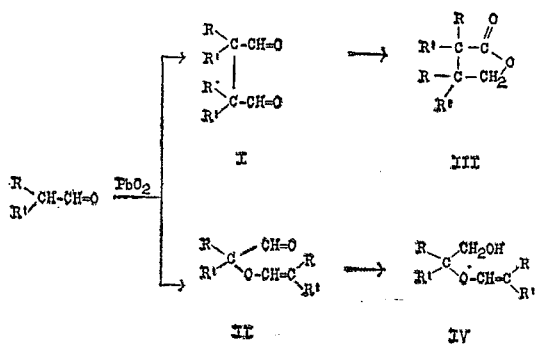

wherein R and R'=alkyl, aryl, heteroaryl, cycloalkyl, alkenyl, alkaryl or aralkyl each with or without additional substituents such as halogen, alkoxyl, nitro or the like.

Representative groups for R and R' thus include methyl, ethyl, propyl, isopropyl, butyl, pentyl, isobutyl, cyclohexyl, cyclopentyl, cyclobutyl, cyclopropyl, phenyl, 4-methoxyphenyl, 4-t-butylphenyl, 4-hexylphenyl, 4-phenylhexyl, 4-hexenyl, pyridyl, thienyl, furyl, 4-chlorophenyl, 3-nitrophenyl, 3-methoxyphenyl and the like. R and R' can be the same or different groups.

The synthesis of this invention is carried out by contacting the aldehyde with lead dioxide for a period sufficient to achieve both carbon to carbon (C—C) and carbon to oxygen (C—O) coupling of the aldehyde with the formation of dimeric compounds of the general structures I and II shown above. The ratio of these coupled products will vary depending upon the exact structure of the starting aldehyde. The ratio of the dimeric coupled aldehydic products is dependent on steric and electronic effects as will be obvious to those skilled in the arts.

The syntheses of this invention are carried out by contacting a 2-substituted aldehyde with lead dioxide for a period of time sufficient to permit the desired reaction to proceed. The reaction is preferably conducted in an inert atmosphere to prevent air oxidation of the aldehydes to acids during the reaction. Contacting the aldehyde with the lead dioxide can be accomplished in any convenient manner. For example, a 2-substituted aldehyde can be slurried with lead dioxide in a solution of an inert solvent. The reaction can be carried out at temperatures ranging from about ambient to 200° C. and preferably from about 60° to 180° C. for a period of time to permit the reaction to proceed, which may range from ½ to 200 hours. The time of reaction at any given temperature is the variable which determines whether dimeric aldehydic coupling products (the primary oxidation products) or the substituted γ-lactones and substittued alkenoxyalcohols will be the predominant products produced. This is shown in Example IV; shorter reaction times at a given temperature favor the initially formed dimeric aldehydes while longer reaction times allow the formation of the γ-lactones and alkenoxy alcohols as the predominant products by in situ Cannizarro reactions. An inert solvent such as methylene chloride, benzene, hexane, pentane, tetrahydrofuran, pyridine, ethanol, methanol, t-butanol, chloroform or the like can be employed.

Another alternative procedure for conducting the reaction is to repeatedly pass an aldehyde through a bed of lead dioxide as a solution in an inert solvent. The end products of the process described in this invention are separated by filtration (in the case of a slurry procedure) and the solvents and unreacted starting materials removed by distillation or by other means. The resultant products can then be separated by distillation, crystallization, chromatography and the like.

The lead dioxide is employed in the synthesis of the invention in amounts ranging from about 1 to 10 moles per mole of the starting aldehyde. Purified or technical grade lead dioxide can be employed.

The following specific examples illustrate the synthesis of the invention.

EXAMPLE I

Reaction of cyclohexanecarboxaldehyde with lead dioxide

A mixture of 45 grams (0.403 mole) cyclohexanecarboxaldehyde, 600 milliliters dioxane and 290 grams (1.22 mole) lead dioxide (technical grade) was prepared; no exotherm was noted on mixing. This mixture was then stirred at reflux temperature for 5.5 hours. A slight positive nitrogen pressure was maintained in the reaction vessel by means of a gaseous nitrogen-filled balloon connected to a gas inlet valve attached to the condenser outlet. The slurry was filtered and the lead oxides were washed with dioxane; the clear filtrate was stripped of solvent under reduced pressure to give 30 grams of crude dimeric products (66%). The crude produce mixture analyzed predominantly as a 55:45 ratio of two products on vapor-phase chromatography over a 10 foot analytical ¼ inch, 10% SE-30 vapor-phase chromatography column. On standing the crude yellow oil partially crystallized. Colorless platelets were filtered away from the oil and washed with pentane. Recrystallization of the solid from pentane gave material melting at 96–98°; a total of 7.8 grams of solid was obtained by repeated crystallizations. The solid, which corresponds to the lesser component observed by vapor-phase chromatography analysis of the crude dimeric mixture, was identified as bis-1,1' - cyclohexanecarboxaldehyde by spectral analysis, carbon-hydrogen-analysis of the dialdehyde hydrate, and subsequent oxidation to the lactolone. The infrared spectrum exhibited absorptions at 3.42μ, 3.50μ, a —CH=O hydrogen stretch at 3.66μ, a —CH=O carbonyl absorption at 5.84μ, and absorptions at 6.90, 10.65, 12.1, 13.23, and 15.05 microns (neat, melt). The nuclear magnetic resonance spectrum exhibited cyclohexane protons at 8.3–9.0τ (16H) and 7.6–7.8τ (broad doublet, 4H) and a —CH=O proton resonance signal at 0.39τ (2H) in a CDCl$_3$ solution. The mass spectrum exhibited a molecular ion at m/e 222 and other major peaks at m/e 204, 193, 176, 175, 123, 112 (1/2 M+1), 111 (1/2 M), 95, 83, 81.

The carbon and hydrogen analysis of the crystalline hydrate of the dialdehyde was:

Calcd. for C$_{14}$H$_{24}$O$_3$ (percent): C, 69.96; H, 10.06.
Found (percent): C, 70.78; H, 10.04.

After crystallization of the dialdehyde as the hydrate, the oil portion (20.6 g.) analyzed as predominantly the lower retention isomer by vapor-phase chromatography although about 20–25% dialdehyde was still present. The liquid isomer was separated by preparative vapor-phase chromatography and analyzed by obtaining pertinent spectra. The more volatile liquid isomer was identified as 1 - (cyclohexanemethylidenoxy) - 1 - cyclohexanecarboxaldehyde from the spectral data. The infrared spectrum exhibited pertinent absorptions at 3.40μ, 3.50μ, a —CH=O C—H absorption at 3.70μ, a —CH=O carbonyl absorption at 5.76μ and a

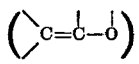

strong olefinic adsorption at 5.94μ; other absorptions appeared at 6.88, 7.25, 7.98, 8.20, 8.66, 8.81 (strong), 9.19, 9.37 and 10.45 microns. The nuclear magnetic resonance spectrum exhibited a —CH=O proton at 0.40τ (1H), a

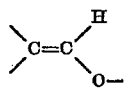

proton at 4.2τ (1H) and broad —CH$_2$-cyclohexane resonance signals at 7.5–8.7τ (20H) (CDCl$_3$); the mass spectrum exhibited a molecular ion at m/e 222 and other peaks at m/e 193, 149, 141, 112 and 99.

The oil portion was steam distilled and an enrichment of the alkenoxyether component was noted in the steam distillate. About half of the material came over in the distillate; the remainder was left in the steam pot and was obtained only after extraction.

Chromic acid oxidation of bis-1,1'-cyclohexanecarboxaldehyde

To a solution of 1.5 grams bis-1,1'-cyclohexanecarboxaldehyde in 10 cubic centimeters acetone and 10 cubic centimeters diethyl ether was slowly added (dropwise) a solution of the Jones reagent (8 N chromic acid) until the orange yellow color of unreacted Cr$^{+6}$ ions was still apparent. The reaction was somewhat exothermic and an ice bath was intermittently employed for cooling purposes. The reaction mixture was poured into water, extracted with ether and then dried. The extracts were stripped of solvent to give 890 milligrams of a crude oily material. This oily residue was taken up in a small portion of pentane and on standing afforded a crystalline material which was filtered and air dried, melting point 134–137°. The solid was identified as the lactolone of 1 - (1' - cyclohexanecarboxaldehyde) - cyclohexanecarboxylic acid from the spectral data. The infrared spectrum exhibited an —OH absorption at 2.92μ, a carbonyl absorption at 5.76μ and other bands at 6.86, 7.34. 7.60, 7.87, 8.23, 8.50, 8.57, 8.81, 8.92, 9.03, 10.55, 10.74, 11.04, 11.30, 11.93, 12.40 and 13.33 microns (Nujol). The nuclear magnetic resonance spectrum exhibited broad —CH$_2$-resonance signals at 7.7–9.1τ (20H); an —OH proton at 5.37τ (1H) and a

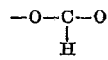

proton at 4.29τ (1H) (CDCl$_3$). The mass spectrum exhibited a molecular ion at m/e 238 and other peaks at m/e 220, 209, -190's-, 164, 128, 111, 112, -90's-.

EXAMPLE II

Reaction of isobutyraldehyde with lead dioxide

A mixture of 55 grams (0.76 mole) isobutyraldehyde, 255 grams (1.07 moles) lead dioxide and 300 cubic centimeters dioxane was prepared and stirred at reflux under a nitrogen atmosphere for a period of 24 hours, then cooled and filtered. The lead oxides were washed with diethyl ether and the combined filtrates stripped of solvent and any unreacted starting material to give 51.6 grams (94%) crude products. The material was analyzed by vapor-phase chromatography on a 6 foot, ¼ inch, 15% Carbowax column and the there major components purified and isolated by preparative gas chromatography.

The first major compound eluting comprised 23% of the volatile components and was identified as 2-methyl-2-(2'-methyl-1'-propenoxy)-propanol from its spectral characteristics compared to those of an authentic sample prepared from the lithium aluminum hydride reduction of 2-methyl-2-(2'-methyl -.1' - propenoxy)-propionaldehyde: the infrared spectrum exhibited a broad —OH absorption at 2.95μ, other absorptions were noted at 3.43, 5.93 (a sharp medium intensity band due to the C=CH—O— double bond), 6.85, 7.25 and 7.32 (gem dimethyl doublet), 8.65 (very strong, C—O—C absorption), 9.47, 11.20, 11.95 and 13.0 microns (neat, film); the nuclear magnetic resonance spectrum exhibited gem dimethyls at 8.83τ (singlet, 6H),

methyls at 8.45τ (doublet, J≅1-2 c.p.s., 6H); —O—H proton at 8.37τ; a

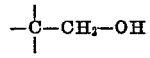

methylene at 6.65τ (singlet, 2H); a —CH=C(CH$_3$)$_2$ proton at 4.17τ (multiplet, 1H) (CCl$_4$ solution).

The second major product, comprising 14% of the volatile components was identified as tetramethylsuccinaldehyde by comparison with an authentic sample. Its infrared spectrum showed the pertinent carbonyl absorption at 5.77μ; the nuclear magnetic resonance spectrum showed singlet peaks at 8.84τ and 0.40τ corresponding to the gem methyls and aldehydic protons in a ratio of 6:1 (CCl$_4$ solution).

The third major component, which accounted for 40% of volatile components, was a white crystalline solid with a marked camphoraceous odor. This material, melting point 97–101°, was identified as the lactone of 2,2,3,3-tetramethyl-4-hydroxybutyric acid by comparison of its spectra with that of an authentic sample. The infrared spectrum exhibited a γ-lactone carbonyl absorption at 5.66μ and the nuclear magnetic resonance spectrum showed gem methyls at 8.92τ (6H) and 9.0τ (6H) as singlets, and a singlet at 6.12τ (2H) corresponding to the C—CH$_2$—O protons (CCl$_4$ solution).

EXAMPLE III

Reaction of 2-methylbutyraldehyde with lead dioxide

A mixture of 160 grams (1.86 moles) 2-methylbutyraldehyde, 640 grams (2.5 moles) lead dioxide and 1000 cubic centimeters of dioxane was prepared and agitated at reflux under a nitrogen atmosphere for a period of 24 hours, then cooled and filtered. The lead oxides were washed with solvent and the total filtrate combined. Excess dioxane and 2-methylbutyraldehyde were removed from the filtrate in vacuo to give 105 grams of crude products. Vapor phase chromatographic analysis of the crude reaction product showed the following ratio of products:

13% cis and trans 2-methyl-2-(2'-methylbutenoxy)-butanol

12% dl and meso 2,3-diethyl-2,3-dimethylsuccinaldehyde
40% cis and trans 2,3-diethyl-2,3-dimethyl-4-hydroxybutyric acid lactone Distillation of the crude product mixture afforded 9 cuts over a four inch Vigreux column at 5 millimeters of mercury. Cuts 1–4, boiling point 70–77°/5 millimeters (19.03 g.) were identified as primarily cis and trans 2-methyl-2-(2'-methylbutenoxy)-butanol from its spectral characteristics: the infrared absorption of a purified sample exhibited a broad —OH absorption at 2.97μ, saturated —CH absorptions at 3.40μ, a sharp olefinic absorption at 5.96μ characteristic of the —O—CH=C< linkage and other absorptions at 6.83, 7.25, 8.65 (strong and broad), 9.3–9.55, 10.07 and 11.95 microns. The nuclear magnetic resonance spectrum in CCl₄ solution varied with time; initially the spectrum exhibited a multiplet centered at 9.08τ, a sharp singlet at 8.88τ (—C—CH₃ group), a multiplet at 8.50τ, a singlet at 6.67τ corresponding to the —C—CH₂OH protons and an olefinic proton signal (—O—CH=C<) at 4.20τ. After 20 minutes a new singlet at 8.81τ had appeared, the peak at 6.67τ had decreased in intensity and was accompanied by a new multiplet absorption at 6.6τ (center). A new multiplet at 5.40τ (two doublets) had appeared corresponding to the two isomeric

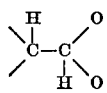

protons of an acetal; it was also noted that the olefinic absorption at 4.2τ was now decreased in intensity. This data was interpreted as demonstrating that the alkenoxy alcohol was isomerized and cyclized in solution to the cyclic acetal, e.g.:

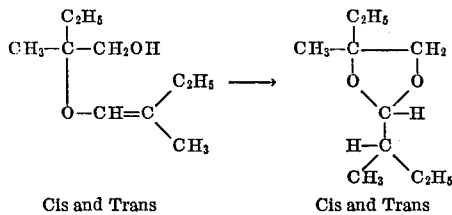

Cis and Trans        Cis and Trans

Cut No. 5, boiling point 77–83°/5 millimeters (7.48 g.), was identified as a mixture of the three components. The dl and meso-2,3-diethyl-2,3-dimethylsuccinaldehyde was identified by direct comparison of vapor-phase chromatography retention times and comparison of its infrared spectrum with that of an authentic sample.

Cuts No. 6–9, boiling point 81–110°/5 millimeters (mainly 87–94°/5 millimeters) (41.8 g.) were identified as the lactone of 2,3-diethyl-2,3-dimethyl-4-hydroxy butyric acid (cis and trans). This lactone exhibited infrared absorptions at 3.40, 5.63 (γ-lactone carbonyl), 6.82, 7.24, 8.05, 8.50, 9.10 (broad and strong), and 9.80 microns (broad and strong); the nuclear magnetic resonance spectrum (in CCl₄) exhibited methyl signals centered at 8.63τ and

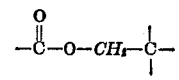

proton resonance signals at 6.10τ (center, multiplet). The spectrum integrated correctly for a nearly equal mixture of the two possible stereoisomeric lactones. The mass spectrum of the isomeric lactone mixture showed a very small peak for the molecular ion at m/e 170, major peaks were at 170–CH₄=m/e 154, 170–C₂H₅=m/e 141, 141–C₂H₅=m/e 112; other peaks were at m/e 96, 83, 82, 68, 54.

EXAMPLE IV

Reaction of isobutyraldehyde in dioxane

In a manner similar to Example II, 65 grams of isobutyraldehyde, 260 grams lead dioxide and 250 cubic centimeters of dioxane were agitated and refluxed for 42 hours. Samples were removed at 2 hour intervals for 6 hours and then at 12 hour intervals. Analysis of the product ratios (excluding unreacted isobutyraldehyde) was made by vapor phase chromatography over a ¼ inch, 10 foot, 10% DEGS column. Product analysis was made by comparison to samples previously identified and is of the volatile components only.

| Time/hour | Products | | | | Others, percent |
|---|---|---|---|---|---|
| | Percent | | | | |
| 0 | 0 | 1 | 0 | 1 | 0 |
| 2 | 47 | 41 | Trace | 5 | 7 |
| 4 | 45 | 40 | 4–7 | 5 | 3–8 |
| 6 | 44 | 33 | 10 | 8 | 5 |
| 18 | 35 | 12 | 23 | 12 | 18 |
| 30 | 28 | 8 | 30 | 15 | 19 |
| 42 | 18 | 5 | 37 | 19 | 21 |

From the foregoing it will be evident that the present invention provides a novel and simple method for producing dimeric aldehydes or substituted γ-lactones and substituted alkenoxyalcohols from 2-substituted aldehydes. Such substituted γ-lactones find utility as odorants in perfumes and as tobacco flavorants. The substituted alkenoxy alcohols are useful as intermediates for the production of substituted acetals. Dimeric 1,4-dialdehydes can be employed as intermediates for the preparation of 1,4-diols, diacids, diimines and diamines which find use in polymerization (as crosslinking agents, etc.). 1,4-dialdehydes can also be used for the preparation of N-alkylpyrrolidine derivatives which have herbicidal activity; they can also be used as starch thickeners.

I claim:

1. A process of preparing γ-lactones which comprises treating with lead dioxide an aldehyde having the formula

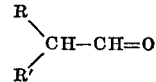

wherein R and R' are selected from the group consisting of alkyl of 1 to 10 carbon atoms, cycloalkyl of 3 to 8 carbon atoms, alkenyl of from 3 to 10 carbon atoms, aryl of from 6 to 10 carbon atoms, aralkyl of from 7 to 11 carbon atoms and alkaryl of from 7 to 11 carbon atoms, or

considered as a unit is a cycloalkyl radical of from 3 to 8 carbon atoms.

2. A process which comprises treating isobutyraldehyde at a temperature ranging from 60 to 200° C. for a period of 6 to 48 hours with lead dioxide to produce 2,2,3,3-tetramethyl-4-hydroxy-butanoic acid lactone and recovering the so-produced lactone.

No references cited.

ALEX MAZEL, Primary Examiner

A. M. T. TIGHE, Assistant Examiner

U.S. Cl. X.R.

252—522; 260—240 R, 295 R, 297 R, 332.2 H, 332.3 H, 347.8, 599, 601 R, 601 H, 602, 611 A, 611 R, 615 R; 131—1; 99—140

UNITED STATES PATENT OFFICE
CERTIFICATE OF CORRECTION

Patent No. 3,658,849            Dated April 25, 1972

Inventor(s) John Charles Leffingwell

It is certified that error appears in the above-identified patent and that said Letters Patent are hereby corrected as shown below:

Column 6, in the Table, under the second and fourth "Products" columns opposite 0 hours, "1" should be -- 0 --

Signed and sealed this 29th day of August 1972.

(SEAL)
Attest:

EDWARD M. FLETCHER, JR.             ROBERT GOTTSCHALK
Attesting Officer                      Commissioner of Patents